3,282,840
STABLE LUBRICATING COMPOSITION AND
INHIBITOR MIXTURE THEREFOR
Lloyd P. Foster, Jr., and Earl W. Wilson, Kingsport, Tenn., assignors to Eastman Kodak Company, Rochester, N.Y., a corporation of New Jersey
No Drawing. Filed June 13, 1963, Ser. No. 287,481
8 Claims. (Cl. 252—50)

This application is related to and a continuation-in-part of U.S. patent application, Serial No. 241,049, filed November 29, 1962, now abandoned, for "Stable Lubricating Composition and Inhibitor Mixture Therefor."

This invention relates to lubricants. More particularly, it relates to the problem of inhibiting oxidative degradation of lubricants, particularly synthetic, ester base, lubricants at temperatures up to about 500° F.

This invention comprises a mixture consisting essentially of (1) phenyl-α-naphthylamine and (2) a diphenylamine selected from the group consisting of diphenylamine, N-($C_1$–$C_8$ alkyl)-diphenylamines and para substituted mono- and di($C_1$–$C_{12}$ alkyl)-diphenylamines and para substituted mono- and di[($C_1$–$C_{12}$ alkyl) phenyl]-diphenylamines, the weight ratio of the phenyl-α-naphthylamine to the diphenylamine being in a range from about 4:1 to about 1:4. This mixture is a highly effective antioxidant and corrosion inhibitor composition for lubricants of both the petroleum base type and the synthetic ester base type.

Hence, this invention comprises a lubricating composition consisting essentially of (A) a lubricant and (B) said mixture at a protective concentration relative to oxidation and corrosion. In the case of most lubricants, satisfactory results are obtained when the concentration of the mixture is in a range from about 0.005 to about 2% by weight of the lubricant. However, higher and lower concentrations can be employed.

This invention is further illustrated by the following examples of various aspects thereof, including specific embodiments of the invention. This invention is not limited to these specific embodiments unless otherwise indicated.

EXAMPLES 1–4

These examples illustrate specific embodiments of the inhibitor composition of this invention.
The formulations of these specific embodiments are:

*Example 1.—Formulation*

| Components: | Parts by weight |
|---|---|
| Phenyl-α-napthylamine | 50 |
| Diphenylamine | 50 |

*Example 2.—Formulation*

| Components: | Parts by weight |
|---|---|
| Phenyl-α-napthylamine | 50 |
| N-methyldiphenylamine | 50 |

*Example 3.—Formulation*

| Components: | Parts by weight |
|---|---|
| Phenyl-α-naphthylamine | 80 |
| p,p'-dioctyldiphenylamine | 20 |

*Example 4.—Formulation*

| Components: | Parts by weight |
|---|---|
| Phenyl-α-naphthylamine | 20 |
| Alkylated styrenated diphenylamine product | 80 |

The alkylated styrenated diphenylamine product is a mixture marketed as Goodrite Staylite. The mixture is made according to the U.S. patent, No. 2,530,769, to Hollis. In brief, it is a normally liquid, oily product consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) to 30–50% by weight of (4) and (5), said product resulting from the reaction of 1.3 to 2.0 chemical equivalents of a hydrocarbon mixture containing diisobutylene and styrene in the ratio of 2–5 parts by weight of diisobutylene to 1 part by weight of styrene, with 1 chemical equivalent of diphenylamine with the aid of a Friedel-Craft condensation catalyst such as aluminum chloride, at a temperature of 150–200° C.

The specific compositions of these formulations are prepared by admixing the components thereof at 20–25° C.

EXAMPLES 5–10

These examples illustrate specific embodiments of a synthetic ester type lubricant composition of this invention.
The formulations of these embodiments are:

*Example 5.—Formulation*

| Components: | Parts by weight |
|---|---|
| Bis(2,2,4-trimethylpentyl)azelate | 100 |
| Inhibitor composition of Example 1 | 1 |

*Example 6.—Formulation*

| Components: | Parts by weight |
|---|---|
| Bis(2,2,4-trimethylpentyl)azelate | 100 |
| Inhibitor composition of Example 2 | 1 |

*Example 7.—Formulation*

| Components: | Parts by weight |
|---|---|
| 2,2,4-trimethylpentanediol-1,3-dipelargonate | 100 |
| Inhibitor composition of Example 1 | 1 |

*Example 8.—Formulation*

| Components: | Parts by weight |
|---|---|
| 2,2,4-trimethylpentanediol-1,3-dipelargonate | 100 |
| Inhibitor composition of Example 2 | 1 |

*Example 9.—Formulation*

| Components: | Parts by weight |
|---|---|
| 2,2,4-trimethylpentanediol-1,3-dipelargonate | 99.375 |
| Inhibitor composition of Example 3 | 0.625 |

*Example 10.—Formulation*

| Components: | Parts by weight |
|---|---|
| 2,2,4-trimethylpentanediol-1,3-dipelargonate | 99.375 |
| Inhibitor composition of Example 4 | 0.625 |

The specific lubricant compositions of the foregoing examples are prepared by admixing the components thereof at 20° C. In this connection, in each case the lubricant composition can be prepared by adding the inhibitor composition to the ester base stock or the individual components of the inhibitor composition can be admixed simultaneously or sequentially with the ester base stock.

Test samples of the foregoing specific, synthetic lubricant compositions and other specific, synthetic lubricant compositions have actually been tested for resistance to oxidative degradation and for inhibition of corrosion.

One test employed was a 347° F. corrosion and oxidation induction test. In the procedure of this test a 125 milliliter test sample of the lubricant composition to be tested is introduced into a large test tube. Five metal blanks of magnesium alloy, aluminum alloy, copper, steel and electrolytic silver are tied together into a bisected parallelogram structure. The structure is then introduced into the lubricant composition in the test tube. An air tube is inserted into the test tube and air is passed through the sample of lubricant composition at a rate of five liters per hour while the temperature of the sample is established and maintained at 347° F. After the test sample has been aerated at this temperature for 72 hours, a specimen is removed and the acid number of the specimen is determined. The test tube, lubricant and metal blanks are inspected for dirtiness. In addition, the metal blanks are checked for corrosion and weight loss. The metal blanks are then reinserted into the lubricant sample in the test tube and aeration is continued. Periodically, specimens of the lubricant are withdrawn from the test tube and their acid numbers determined. A plot is made from the acid number data in order to determine the stable life or useful life of the lubricant composition. The stable life or useful life end point of the lubricant composition under the conditions of this test is the time at which the acid number of the lubricant begins to rise rapidly in comparison to time.

In the first set of test samples, bis(2,2,4-trimethylpentyl) azelate, a dibasic acid ester, was the lubricant. The test samples were prepared by admixing with this synthetic ester base stock the additives at the concentrations indicated in the following Table I. The test results and observations are summarized in Table I.

TABLE I

| Sample No. | Concentration of Phenyl-α-naphthyl-amine in percent by wt. of lubricant | Concentration of Diphenyl-amine in percent by weight of lubricant | Concentration of N-methyl diphenyl-amine in percent by wt. of lubricant | Useful Life in Hours | Dirtiness Rating at 72 Hours | | | Metals Weight Loss in mg./cm.² and Corrosion at 72 Hours | | | | |
|---|---|---|---|---|---|---|---|---|---|---|---|---|
| | | | | | Test Tube | Sample | Metal Blanks | Magnesium | Aluminum | Copper | Steel | Silver |
| 1 | 0 | 0 | 0 | <72 | Light Clean | Slight Clear | Clean None | 36-SC | 0.00-N | 1.3-SC | 0.03-N | 0.00-N |
| 2 | 0.50 | 0 | 0 | 90 | Clean | Clear | do | 0.00-N | 0.00-N | 0.07-N | 0.01-N | 0.01-N |
| 3 | 1.00 | 0 | 0 | 400 | do | do | do | 0.00-N | 0.00-N | 0.03-N | 0.02-N | 0.02-N |
| 4 | 0 | 0.50 | 0 | 90 | do | do | do | 0.00-N | 0.01-N | 0.14-N | 0.01-N | 0.03-N |
| 5 | 0 | 1.00 | 0 | 260 | do | do | do | 0.00-N | 0.00-N | 0.11-N | 0.00-N | 0.00-N |
| 6 | 0.25 | 0.25 | 0 | 165 | do | do | do | 0.00-N | 0.01-N | 0.01-N | 0.01-N | 0.01-N |
| 7 | 0.50 | 0.50 | 0 | >740 | do | do | do | +0.02-N | 0.01-N | 0.07-N | 0.02-N | 0.02-N |
| 8 | 1.00 | 1.00 | 0 | >740 | do | do | do | 0.00-N | 0.01-N | 0.02-N | 0.02-N | 0.02-N |
| 9 | 0 | 0 | 1.00 | 60 | do | do | do | +0.01-N | 0.00-N | 0.13-N | 0.00-N | 0.00-N |
| 10 | 0.50 | 0 | 0.50 | 180 | do | do | do | 0.00-N | 0.00-N | 0.07-N | 0.01-N | 0.01-N |

In the foregoing Table I the symbol "SC" indicates severe corrosion while "N" indicates no corrosion.

Sample 7, it will be observed, corresponds to the specific composition of Example 3 while Sample 10 corresponds to the specific composition of Example 4.

The data of Table I shows that the specific inhibitor compositions of this invention are highly effective in protecting a synthetic ester base lubricant against oxidative degradation and in minimizing corrosion. Moreover, comparison of the useful life of Sample 7 with the useful lives of Samples 2 and 4, and the useful life of Sample 8 with Samples 3 and 5 reveals synergism on the part of the inhibitor composition or mixture of this invention.

In the second set of test samples, 2,2,4-trimethylpentanediol-1,3-dipelargonate, and ester of a glycol and a mono-basic or monocarboxylic acid, was the lubricant. The test samples were prepared by admixing with this synthetic ester base stock the additives at the concentrations indicated in the following Tables II and III. The test results and observations are summarized in Tables II and III.

TABLE II

| Sample No. | Concentration of Phenyl-α-naphthyl-amine in percent by wt. of lubricant | Concentration of Diphenyl-amine in percent by weight of lubricant | Concentration of N-methyl diphenyl-amine in percent by wt. of lubricant | Useful Life in Hours | Dirtiness Rating at 72 Hours | | | Metals Weight Loss in mg./cm.² and Corrosion at 72 Hours | | | | |
|---|---|---|---|---|---|---|---|---|---|---|---|---|
| | | | | | Test Tube | Sample | Metal Blanks | Magnesium | Aluminum | Copper | Steel | Silver |
| 1 | 0 | 0 | 0 | 0 | Clean | Clear | Clean | 35-HC | +0.03-N | 3.7-HC | +0.03-N | +0.02-N |
| 2 | 0.0025 | 0 | 0 | 6.5 | | | | | | | | |
| 3 | 0.050 | 0 | 0 | 15 | | | | | | | | |
| 4 | 0.125 | 0 | 0 | 25 | | | | | | | | |
| 5 | 0.50 | 0 | 0 | 115 | Clean | Clear | Clean | 0.00-N | 0.00-N | 0.00-N | 0.00-N | 0.00-N |
| 6 | 1.000 | 0 | 0 | 510 | do | do | do | +0.01-N | +0.01-N | 0.03-N | 0.00-N | 0.00-N |
| 7 | 0 | 0.050 | 0 | 6.0 | | | | | | | | |
| 8 | 0 | 0.125 | 0 | 8.0 | | | | | | | | |
| 9 | 0 | 0.250 | 0 | 25 | | | | | | | | |
| 10 | 0 | 0.50 | 0 | 70 | Clean | Clear | Clean | +0.04-N | +0.04-N | 0.04-N | +0.04-N | +0.03-N |
| 11 | 0 | 1.00 | 0 | 262 | Clean | Clear | Clean | +0.07-S | +0.04-N | 0.04-N | +0.03-N | +0.03-N |
| 12 | 0.0025 | 0.0025 | 0 | 12.5 | | | | | | | | |
| 13 | 0.050 | 0.050 | 0 | 23 | | | | | | | | |
| 14 | 0.125 | 0.125 | 0 | 35 | | | | | | | | |
| 15 | 0.125 | 0.250 | 0 | 80 | | | | | | | | |
| 16 | 0.125 | 0.50 | 0 | 300 | | | | | | | | |
| 17 | 0.250 | 0.250 | 0 | 166 | Clean | Clear | Clean | +0.04-N | +0.03-N | .0.01-N | +0.04-N | +0.03-N |
| 18 | 0.50 | 0.125 | 0 | 190 | | | | | | | | |
| 19 | 0.50 | 0.50 | 0 | 900 | Clean | Clear | Clean | 0.00-N | 0.00-N | 0.04-N | 0.00-N | 0.00-N |
| 20 | 0.50 | 1.00 | 0 | 720 | | | | | | | | |
| 21 | 1.00 | 0.50 | 0 | 720 | | | | | | | | |
| 22 | 1.00 | 1.00 | 0 | 900 | Clean | Clear | Clean | 0.00-N | 0.00-N | 0.01-N | 0.00-N | 0.00-N |
| 23 | 0 | 0 | 1.00 | 72 | do | do | do | +0.04-HE | +0.04-N | 0.29-C | +0.05-N | 0.02-N |
| 24 | 0.50 | 0 | 0.50 | 166 | do | do | do | +0.02-N | +0.03-N | +0.03-N | +0.02-N | +0.02-N |

In the foregoing Table II, "H.C." means heavy corrosion, "N" means no corrosion, "S" slight corrosion (in the one case there was one pit), "C" means corrosion and "H.E." signified heavy electrolytic effect.

Sample 19, it will be observed, corresponds to the formulation of Example 5 while Sample 24 corresponds to the formulation of Example 6.

The data of Table II demonstrates that the inhibitor mixtures of this invention at concentrations in a range from about 0.005 to about 2% by weight of the lubricant are highly effective in protecting synthetic ester base type lubricants against oxidative degradation and in minimizing corrosion. Moreover, comparison of the useful lives of Samples 13–22 with the useful lives of Samples 3–11 reveals that the inhibitor mixtures of this invention are synergistic in effect.

TABLE III

| Sample No. | Concentration of Phenyl-α-Naphthylamine in percent by weight of lubricant | Concentration of p,p′-Dioctyl-diphenylamine in percent by weight of lubricant | Concentration of Alkylated Styrenated Diphenylamine Product in percent by weight of lubricant | Useful Life in Hours |
|---|---|---|---|---|
| 1 | 0 | 0 | 0 | 0 |
| 2 | 0.125 | 0 | 0 | 31 |
| 3 | 0.500 | 0 | 0 | 108 |
| 4 | 0 | 0.125 | 0 | 15 |
| 5 | 0 | 0.50 | 0 | 28 |
| 6 | 0.125 | 0.500 | 0 | 120 |
| 7 | 0.50 | 0.125 | 0 | 130 |
| 8 | 0 | 0 | 0.125 | 5 |
| 9 | 0 | 0 | 0.50 | 30 |
| 10 | 0.125 | 0 | 0.50 | >260 |
| 11 | 0.50 | 0 | 0.125 | 170 |

Sample 7, it will be observed, corresponds to the formulation of Example 9 while sample 10 corresponds to the formulation of Example 10.

The data of Table III likewise demonstrate that the inhibitor mixtures of this invention at concentrations in a range from about 0.005 to about 2% by weight of the lubricant are highly effective in protecting synthetic ester base type lubricants against oxidative degradation. Moreover, comparison of the useful lives of samples 6 and 7 with the useful lives of samples 2–5 and the useful lives of samples 10–11 with the useful lives of samples 2–3 and 8–9 reveals that the inhibitor mixtures of this invention are synergistic in effect.

Another test employed is the 325° F. lead corrosion test described in Federal Test Method Standard No. 791. This test is an indication of the corrosiveness of the lubricant composition to lead-indium bearings both before and after storage under accelerated conditions. Two weeks' storage at 185° F. has been roughly equated to a storage of one year under tropical conditions, while 45 days of storage at 185° F. has been equated to an actual storage of three years under tropical conditions.

In the first set of samples subjected to the 325° F. lead corrosion test the lubricant was bis(2,2,4-trimethylpentyl) azelate. The samples were prepared by admixing this lubricant with the additives at the concentrations indicated in the following Table IV. The test results are set forth in Table IV.

TABLE IV

| Sample No. | Concentration of Phenyl-α-Naphthyl-amine in percent by weight of lubricant | Concentration of Diphenyl-amine in percent by weight of lubricant | Concentration of N-methyl Diphenyl-amine in percent by weight of lubricant | Weight Loss of Lead in mg./in.$^2$ | | |
|---|---|---|---|---|---|---|
| | | | | Initial | Stored 14 Days at 185° F. | Stored 45 Days at 185° F. |
| 1 | 0.00 | 0.00 | 0.00 | 30 | 46 | 32 |
| 2 | 0.50 | 0.00 | 0.00 | 1.3 | 1.2 | 1.2 |
| 3 | 1.00 | 0.00 | 0.00 | 1.6 | 1.8 | 1.2 |
| 4 | 0.00 | 0.50 | 0.00 | 1.4 | 1.9 | 1.3 |
| 5 | 0.00 | 1.00 | 0.00 | 1.4 | 1.3 | 1.4 |
| 6 | 0.25 | 0.25 | 0.00 | 1.4 | 1.2 | 0.8 |
| 7 | 0.50 | 0.50 | 0.00 | 1.1 | 1.2 | 1.3 |
| 8 | 1.00 | 1.00 | 0.00 | 1.1 | 1.2 | 1.4 |
| 9 | 0.00 | 0.00 | 1.00 | 1.8 | 2.0 | 2.5 |
| 10 | 0.00 | 0.50 | 0.50 | 1.0 | 1.3 | 1.1 |

Sample 7 in Table IV, it will be noted, is identical to the formulation of Example 3 while sample 10 is identical to the formulation of Example 4.

The data of Table IV show the excellent corrosion inhibition properties of the specific, inhibitor compositions or mixtures of this invention.

In the second set of samples subject to the 325° F. lead corrosion test the lubricant was 2,2,4-trimethyl pentanediol-1,3-dipelargonate. The samples were prepared by admixing this lubricant with the additives at the concentrations indicated in the following Table V. The test results are set forth in Table V.

TABLE V

| Sample No. | Concentration of Phenyl-α-Naphthylamine in percent by weight of lubricant | Concentration of Diphenylamine in percent by weight of lubricant | Concentration of N-methyl Diphenylamine in percent by weight of lubricant | Weight Loss of Lead in mg./in.$^2$ | | |
|---|---|---|---|---|---|---|
| | | | | Initial | Stored 14 Days at 185° F. | Stored 45 Days at 185° F. |
| 1 | 0.00 | 0.00 | 0.00 | 46 | 40 | 42 |
| 2 | 0.50 | 0.00 | 0.00 | +0.4 | +0.2 | +0.4 |
| 3 | 1.00 | 0.00 | 0.00 | +0.9 | +1.5 | +0.7 |
| 4 | 0.00 | 0.05 | 0.00 | +0.3 | 2.4 | 1.8 |
| 5 | 0.00 | 1.00 | 0.00 | +0.5 | 0.3 | 1.7 |
| 6 | 0.25 | 0.25 | 0.00 | 1.3 | +1.0 | +0.8 |
| 7 | 0.50 | 0.50 | 0.00 | +1.1 | +1.7 | +0.8 |
| 8 | 1.00 | 1.00 | 0.00 | +2.0 | 0.1 | +0.1 |
| 9 | 0.00 | 0.00 | 1.00 | 6.1 | 6.9 | 7.3 |
| 10 | 0.50 | 0.00 | 0.50 | +0.1 | 0.2 | +0.2 |

Samples 7 and 10 have the same formulations as the specific lubricant compositions of Examples 5 and 6.

The data of Table V likewise show the excellent corrosion inhibition properties of the specific embodiments of the inhibitor composition of this invention when incorporated into a lubricant.

Thus, this invention provides a highly effective oxidation-corrosion inhibitor composition which is particularly useful in lubricants.

Moreover, this invention provides a lubricant composition characterized by an extremely long usable life, low coking and sludging tendencies and good storage stability.

Other features, advantages and specific embodiments of this invention will be readily apparent to those in the exercise of ordinary skill in the art after reading the foregoing disclosures. In this connection, while this invention has been described in considerable detail relative to specific embodiments thereof, variations and modifications of these embodiments can be effected within the spirit and scope of the invention as disclosed and claimed.

The embodiments of the invention in which an exclusive property or privilege is claimed are defined as follows:

1. An inhibitor composition consisting essentially of phenyl-α-naphthylamine and a diphenylamine selected from the group consisting of diphenylamine and a alkylated styrenated diphenylamine, the weight ratio of one to the other being in a range from about 4:1 to about 1:4; said alkylated styrenated diphenylamine consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) and 30–50% by weight of (4) and (5).

2. An inhibitor composition consisting essentially of phenyl-α-naphthylamine and diphenylamine at a weight ratio in a range from about 4:1 to about 1:4.

3. An inhibitor composition consisting essentially of phenyl-α-naphthylamine and an alkylated styrenated diphenylamine product at a weight ratio in a range from about 4:1 to about 1:4; said alkylated styrenated diphenylamine consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) and 30–50% by weight of (4) and (5).

4. A lubricant composition consisting essentially of a lubricant and, at an oxidation and corrosion inhibiting concentration, a mixture consisting essentially of phenyl-α-naphthylamine and a diphenylamine selected from the group consisting of diphenylamine and alkylated styrenated diphenylamine, the weight ratio of one to the other being in a range from about 4:1 to about 1:4; said alkylated styrenated diphenylamine consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) and 30–50% by weight of (4) and (5).

5. A lubricant composition consisting essentially of a synthetic ester lubricant and, at a concentration in a range from about 0.005 to about 2% by weight of said lubricant, a mixture consisting essentially of phenyl-α-naphthylamine and a diphenylamine selected from the group consisting of diphenylamine, and alkylated styrenated diphenylamine, the weight ratio of one to the other being in a range from about 4:1 to about 1:4; said alkylated styrenated diphenylamine consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) and 30–50% by weight of (4) and (5).

6. A lubricant composition consisting essentially of an ester base stock consisting essentially of 2,2,4-trimethyl pentanediol-1,3-dipelargonate and, at a concentration in a range from about 0.005 to about 2% by weight of said stock, a mixture consisting essentially of phenyl-α-naphthylamine and diphenylamine at a weight ratio in a range from about 4:1 to about 1:4.

7. A lubricant composition consisting essentially of an ester base stock consisting essentially of bis(2,2,4-trimethylpentyl)azelate and, at a concentration in a range from about 0.005 to about 2% by weight of said stock, a mixture consisting essentially of phenyl-α-naphthylamine and diphenylamine at a weight ratio in a range from about 4:1 to about 1:4.

8. A lubricant composition consisting essentially of an ester base stock consisting essentially of 2,2,4-trimethyl-pentanediol-1,3-dipelargonate and, at a concentration in a range from about 0.005 to about 2% by weight of said stock, a mixture consisting essentially of phenyl-α-naphthylamine and an alkylated styrenated diphenylamine product at a weight ratio in a range from about 4:1 to about 1:4; said alkylated styrenated diphenylamine consisting essentially of (1) p,p'-di-t-octyldiphenylamine, (2) p,p'-di-α-phenethyldiphenylamine, (3) p-t-octyl-p'-α-phenethyldiphenylamine, (4) p-mono-t-octyl-diphenylamine and (5) p-mono-α-phenethyldiphenylamine in the ratio of 50–70% by weight of (1), (2) and (3) and 30–50% by weight of (4) and (5).

References Cited by the Examiner

UNITED STATES PATENTS

| | | | |
|---|---|---|---|
| 2,530,769 | 11/1950 | Hollis | 252—401 |
| 2,798,083 | 7/1957 | Bell | 252—56 X |
| 2,930,758 | 3/1960 | Tierney | 252—57 X |
| 3,048,542 | 8/1962 | Tierney et al. | 252—56 |
| 3,053,768 | 9/1962 | Cupper | 252—56 X |
| 3,148,147 | 9/1964 | Bell et al. | 252—56 |

FOREIGN PATENTS 750,560    6/1956    Great Britain.

OTHER REFERENCES

Cohen, George: Aliphatic Esters; Industrial and Engineering, volume 45, August 1953, pp. 1766–1774.

DANIEL E. WYMAN, *Primary Examiner.*

C. O. THOMAS, P. E. KONOPKA, *Assistant Examiners.*